(12) United States Patent
Kim et al.

(10) Patent No.: US 9,156,008 B2
(45) Date of Patent: Oct. 13, 2015

(54) CARDO COPOLYBENZIMIDAZOLES, GAS SEPARATION MEMBRANES AND PREPARATION METHOD THEREOF

(71) Applicant: KOREA INSTITUTE OF SCIENCE AND TECHNOLOGY, Seoul (KR)

(72) Inventors: Hyoung-Juhn Kim, Gyeonggi-do (KR); Jun Young Han, Seoul (KR); Jong Hyun Jang, Seoul (KR); Eun Ae Cho, Seoul (KR); Jonghee Han, Seoul (KR); Suk Woo Nam, Seoul (KR); Tae-Hoon Lim, Seoul (KR); Sung Pil Yoon, Gyeonggi-do (KR); Sung Jong Yoo, Seoul (KR); Dirk Henkensmeier, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 29 days.

(21) Appl. No.: 13/892,548

(22) Filed: May 13, 2013

(65) Prior Publication Data
US 2014/0224124 A1 Aug. 14, 2014

(30) Foreign Application Priority Data

Feb. 12, 2013 (KR) .................. 10-2013-0014948

(51) Int. Cl.
*B01D 71/62* (2006.01)
*B01D 53/22* (2006.01)
(Continued)

(52) U.S. Cl.
CPC .............. *B01D 71/62* (2013.01); *B01D 53/228* (2013.01); *B01D 67/0002* (2013.01);
(Continued)

(58) Field of Classification Search
CPC .. B01D 53/228; B01D 71/62; B01D 67/0002; B01D 67/0095; B01D 2256/12; B01D 2257/102; C08G 73/18; C01B 13/0251
USPC ........... 96/4, 14; 95/45, 54, 55; 528/179, 186; 427/244
See application file for complete search history.

(56) References Cited

U.S. PATENT DOCUMENTS

2005/0000899 A1* 1/2005 Koros et al. .................. 210/650
2007/0087248 A1* 4/2007 Fujibayashi .................... 429/33
(Continued)

FOREIGN PATENT DOCUMENTS

EP   1 213 049 A1   6/2002

OTHER PUBLICATIONS

Srinivasan, P.R., "Preparation and Properties of Polyimidazoles Containing Cardo Groups", Journal of Polmer Sciences, Polymer Chemistry Edition, 1982, vol. 20, pp. 3095-3105.*
(Continued)

*Primary Examiner* — Jason M Greene
(74) *Attorney, Agent, or Firm* — Ladas & Parry LLP

(57) ABSTRACT

Provided are cardo copolybenzimidazoles, a gas separation membrane using the same and a method for preparing the same. More particularly, provided are cardo copolybenzimidazoles obtained by introducing cardo groups and aromatic ether groups to a polybenzimidazole backbone, a gas separation membrane having significantly improved oxygen permeability by using the same, and a method for preparing the same. The cardo copolybenzimidazoles have improved solubility as compared to the polybenzimidazole polymers according to the related art, show excellent mechanical properties while maintaining thermal stability so as to be formed into a film shape, and provide a gas separation membrane having significantly improved gas permeability, particularly, oxygen permeability.

19 Claims, 6 Drawing Sheets

(51) Int. Cl.
   *B01D 67/00* (2006.01)
   *C08G 73/18* (2006.01)
   *C01B 13/02* (2006.01)

(52) U.S. Cl.
   CPC ....... *B01D 67/0095* (2013.01); *C01B 13/0251* (2013.01); *C08G 73/18* (2013.01); *B01D 2256/12* (2013.01); *B01D 2257/102* (2013.01)

(56) References Cited

U.S. PATENT DOCUMENTS

| | | | |
|---|---|---|---|
| 2011/0192281 A1* | 8/2011 | Hosseini et al. | 96/14 |
| 2012/0115050 A1* | 5/2012 | Kim et al. | 429/408 |
| 2014/0047976 A1* | 2/2014 | Yeong et al. | 95/45 |

OTHER PUBLICATIONS

P. Srinivasan, et al; "Preparation and Properties of Polybenzimidazoles Containing Cardo Groups", Journal of Polymer Sciences: Polymer Chemistry Edition, vol. 20, pp. 3095-3105; Nov. 1982.

Kathryn A. Berchtold, et al; "Polybenzimidazole composite membranes for high temperature synthesis gas separations", Journal of Membrane Science, vols. 415-416, pp. 265-270; Available online May 10, 2012.

Guey-Sheng Liou, et al; "Synthesis and Properties of Wholly Aromatic Polymers Bearing Cardo Fluorene Moieties", Journal of Polymer Science: Part A: Polymer Chemistry, vol. 45, pp. 4352-4363; Article first published online: Aug. 3, 2007.

* cited by examiner

CARDO COPOLYBENZIMIDAZOLES, GAS SEPARATION MEMBRANES AND PREPARATION METHOD THEREOF

CROSS-REFERENCE TO RELATED APPLICATIONS

This application claims priority under 35 U.S.C. §119 to Korean Patent Application No. 10-2013-0014948 filed on Feb. 12, 2013, in the Korean Intellectual Property Office, the disclosure of which is incorporated herein by reference in its entirety.

TECHNICAL FIELD

The following disclosure relates to cardo copolybenzimidazoles, a gas separation membrane using the same and a method for preparing the same. More particularly, the following disclosure relates to cardo copolybenzimidazoles obtained by introducing cardo groups and aromatic ether groups to a polybenzimidazole backbone, a gas separation membrane having significantly improved oxygen permeability by using the same, and a method for preparing the same.

BACKGROUND

In general, polybenzimidazole-based polymers have higher density as compared to other aromatic polymers, and exhibit a thermal decomposition temperature of 500° C. or higher and a glass transition temperature of 400° or higher. Thus, such polybenzimidazole-based polymers having the highest thermal, chemical and physical stability among the polymers known to date have been used in various industrial fields.

However, while such polybenzimidazoles are highly crystalline and have excellent mechanical strength, they show poor solubility to organic solvents and low permeability to substantially all types of gases, and thus are limited in application to gas separation membranes. It is known that this is because the hydrogen molecules present on the polymeric chain cause hydrogen bonding between one chain and another, so that the polymer structure becomes rigid and the polymeric chains are packed closely. Therefore, some researchers have conducted many studies to inhibit such packing of polymeric chains and to reduce the rotational movement of polymeric chains. Additional studies have conducted about modification of the polymeric backbone to increase the free volume between one polymeric chain and another, and thus to improve gas permeability.

One of the above studies has made an attempt to increase solubility of polybenzimidazole in order to overcome the problem of poor processability and limited application of polybenzimidazole caused by low solubility characteristics unique to polybenzimidazole. Particularly, P. R. Srinivasan et al. have reported that polybenzimidazole obtained by introducing fluorene as a cardo group to the backbone of polybenzimidazole realizes improved solubility, while maintaining thermal stability thereof (Non-patent Document 1). However, there is no disclosure about forming the polybenzimidazole into a film shape and using the same as a gas separation membrane. It is thought that even though polybenzimidazole may be formed into a film shape, the resultant film is too brittle to apply it to industrial applications due to the structural characteristics of polybenzimidazole.

In addition, it is reported that a composite membrane obtained by coating polybenzimidazole onto the outer surface of a steel support layer (intermediate layer: zirconia) is used to determine the gas permeability (Non-Patent Document 2). However, this is merely about permeability-selectivity of hydrogen and carbon dioxide from hot syngas, and there is no suggestion about oxygen permeability using a polybenzimidazole-based monolayer membrane.

Meanwhile, Guey-Sheng Liou et al. have reported that wholly aromatic polyamide (aramid), polyester (polyarylate) and poly(1,3,4-oxadiazole) having a polymeric backbone to which fluorene is introduced as a cardo group is prepared to improve the solubility of polymer, and the resultant polymer formed into a film shape provides excellent light-emitting properties and may be used as a blue light-emitting material of a polymeric light-emitting device (Non-Patent Document 3). However, there is no suggestion or disclosure about the use of polymer as a gas separation membrane.

Further, a polyimide-based single membrane including cardo groups introduced to a polyimide backbone having thermal properties and mechanical properties similar to those of polybenzimidazole has been determined for its gas permeability. However, this is merely about permeability-selectivity of nitrogen and carbon dioxide (Patent Document 1).

Therefore, the present disclosure provides a gas separation membrane obtained by forming a membrane from polybenzimidazole having significantly improved oxygen permeability by virtue of an increased distance between one polybenzimidazole chain and another, while maintaining high anticorrosive property and thermal/chemical stability. Particularly, it is required that polymers for use in On Board Inert Gas Generation System (OBIGGS) have heat resistance at 90° C. or higher, which is the air temperature of an aircraft engine, and provide excellent oxygen permeability and selectivity over nitrogen, which is inert gas in the fuel tank of an aircraft. Thus, the polybenzimidazole gas separation membrane disclosed herein may be used as a material suitable for OBIGGS.

REFERENCES OF THE RELATED ART

Patent Document (Patent Document 1) EP1213049

Non-Patent Document (Non-patent Document 1) P. R. Srinivasan et al., *J. Polym. Sci. Polym. Chem. Ed.*, 20, 3095-3105 (1982)

(Non-patent Document 2) Kathryn A. Berchtold et al., *J. Membr. Sci.* 415-416 (2012) 265-270

(Non-patent Document 3) Guey-Sheng Liou et al., *J. Polym. Sci. Polym. Chem. Ed.*, 45, 4352-4363 (2007)

SUMMARY

An embodiment of the present invention is directed to providing cardo copolybenzimidazoles which have improved solubility as compared to the polybenzimidazole according to the related art, maintain thermal stability and show excellent mechanical properties so as to be formed into a film shape, and solve the problem of low gas permeability of the polybenzimidazole according to the related art to provide significantly improved gas permeability, particularly, oxygen permeability so as to be used as a gas separation membrane. Another embodiment of the present invention is directed to providing a gas separation membrane using the cardo copolybenzimidazoles. Still another embodiment of the present invention is directed to providing a method for preparing the cardo copolybenzimidazoles.

In one general aspect, there are provided cardo copolybenzimidazoles having repeating units represented by the following Chemical Formula 1:

<Chemical Formula 1>

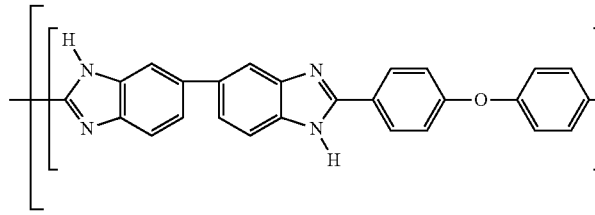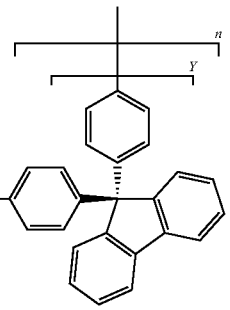

wherein $0.05 \leq x \leq 0.5$, $0.5 \leq y \leq 0.95$, and $x+y=1$.

In another general aspect, there is provided a method for preparing cardo copolybenzimidazoles, comprising the steps of:
  i) dissolving 3,3'-diaminobenzidine and 9,9-bis(4-carboxyphenyl)fluorene as monomers and an aromatic dicarboxylic acid as a comonomer into a polymerization solvent under argon atmosphere and agitating them at 130-150° C. for 2-5 hours;
  ii) heating the reaction mixture of i) to 170-180° C. to carry out polycondensation for 12-15 hours;
  iii) carrying out precipitation of the polymer solution obtained from ii) in deionized water and removing the residual phosphoric acid; and
  iv) carrying out drying in a vacuum oven at 60-100° C. to obtain polymer powder.

According to an embodiment, the aromatic dicarboxylic acid used as a comonomer in i) may be any one selected from the group consisting of 4,4'-oxybis(benzoic acid), diphenic acid, biphenyl-4,4'-dicarboxylic acid, 4,4'-sulfonyldibenzoic acid, 4,4'-(hexafluoroisopropylidene)bis(benzoic acid), terephthalic acid and isophthalic acid.

According to another embodiment, the polymerization solvent used in i) may be polyphosphoric acid, or a mixed solvent of phosphorus pentaoxide with methanesulfonic acid.

According to still another embodiment, the residual phosphoric acid may be removed in iii) by washing the precipitate with 12% aqueous ammonia at 40-50° C. for 2-3 days, followed by washing with deionized water to a neutral pH.

In still another general aspect, there is provided a gas separation membrane using the cardo copolybenzimidazoles having the repeating units represented by the above Chemical Formula 1.

In yet another general aspect, there is provided a method for producing a cardo copolybenzimidazole-based gas separation membrane, comprising the steps of:
  i) dissolving powder of cardo copolybenzimidazoles into an organic solvent to provide a solution of cardo copolybenzimidazoles;
  ii) filtering the solution of cardo copolybenzimidazoles through a porous syringe filter;
  iii) applying the solution obtained from ii) on a flat glass plate; and
  iv) drying the solution in a vacuum oven at 60-100° C. to obtain a transparent cardo copolybenzimidazole-based membrane.

According to an embodiment, the organic solvent used in i) may be any one selected from the group consisting of dimethyl sulfoxide (DMSO), dimethyl acetamide (DMAC), dimethyl formamide (DMF) and N-methylpyrrolidone (NMP).

According to another embodiment, the solution of cardo copolybenzimidazoles may have a concentration of 2-15 wt %.

According to still another embodiment, the transparent cardo copolybenzimidazole-based membrane obtained from iv) may have a thickness of 30-60 μm.

The cardo copolybenzimidazoles disclosed herein have improved solubility as compared to the polybenzimidazole polymers according to the related art, show excellent mechanical properties while maintaining thermal stability so as to be formed into a film shape, and provide a gas separation membrane having significantly improved gas permeability, particularly, oxygen permeability.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
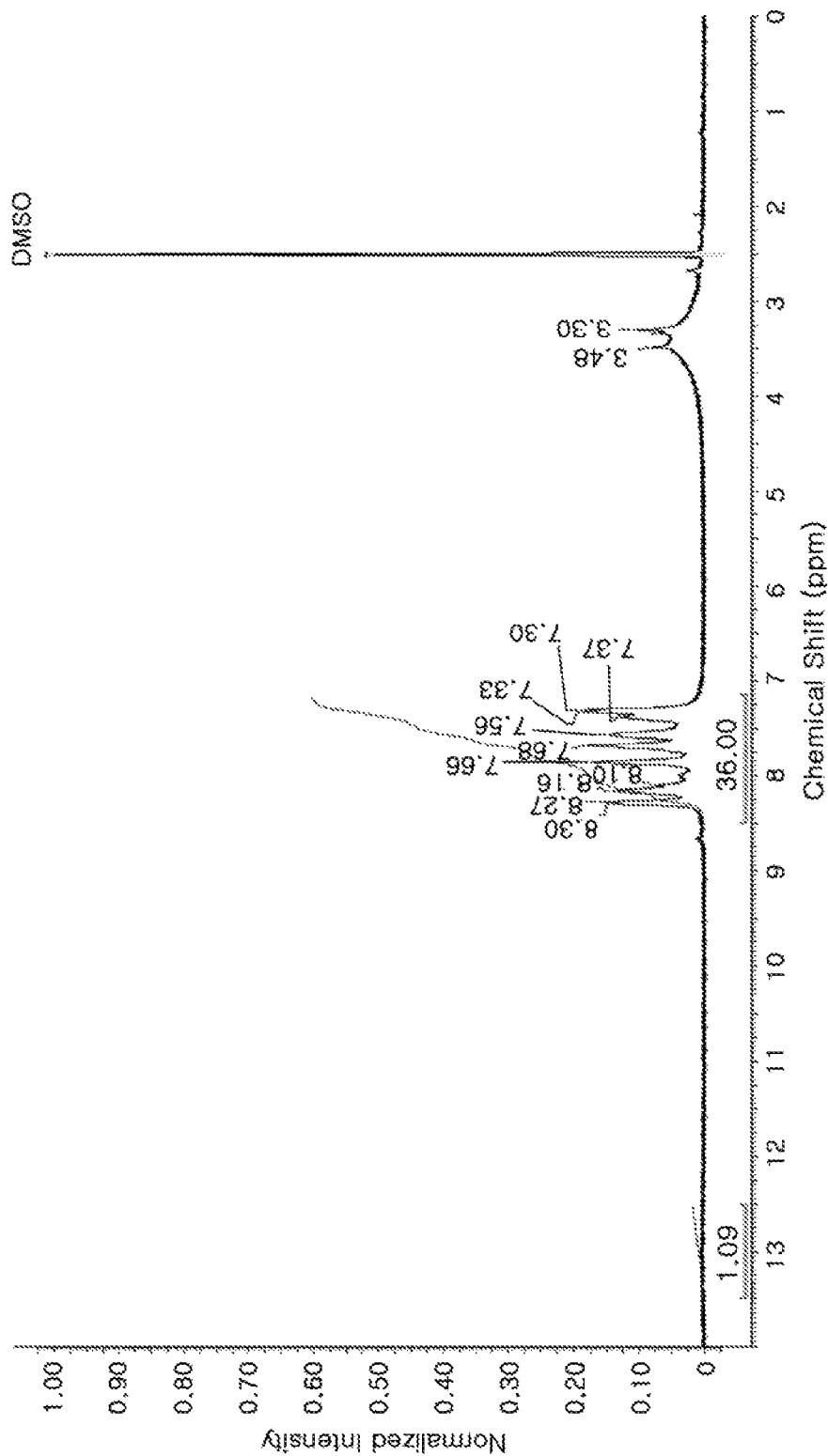
FIG. 1 shows $^1$H-NMR spectrum of cardo copolybenzimidazoles obtained from Example 1.

Hereinafter, the cardo copolybenzimidazoles and the method for preparing the same will be explained in detail.

First, to form polybenzimidazole repeating units according to an embodiment, 3,3'-diaminobenzidine represented by the following Chemical Formula I and 9,9-bis(4-carboxyphenyl)fluorene represented by the following Chemical Formula II are used as a tetramine monomer reactant and as an aromatic dicarboxylic acid monomer reactant, respectively.

In one aspect, there are provided cardo copolybenzimidazoles having repeating units represented by the following Chemical Formula 1:

<Chemical Formula 1>

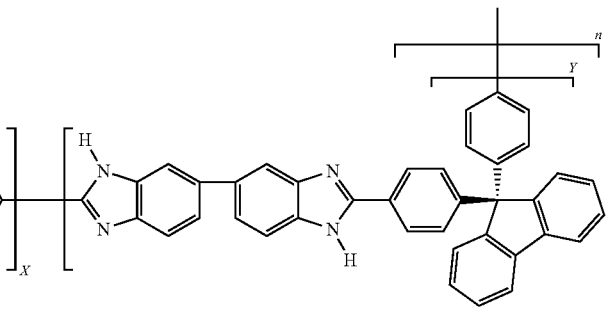

wherein $0.05 \leq x \leq 0.5$, $0.5 \leq y \leq 0.95$, and $x+y=1$.

In Chemical Formula 1, each of x and y represents the molar content of each structural unit in the repeating units of cardo copolybenzimidazoles, and corresponds to the molar ratio of 4,4'-oxybis(benzoic acid) of Chemical Formula III and 9,9-bis(4-carboxyphenyl)fluorene of Chemical Formula II that react with 1 mole of 3,3'-diaminobenzidine of Chemical Formula I.

Unlike the polybenzimidazole homopolymer according to the related art, the present disclosure provides copolybenzimidazoles. Thus, it is important to control the molar content of x derived from 4,4'-oxybis(benzoic acid) of Chemical Formula III. When x is less than 0.05, the resultant cardo copolybenzimidazoles show poor mechanical properties. On the other hand, when x is greater than 0.5, mechanical properties may be improved but gas permeability may be degraded. Therefore, x and y have the range as defined in Chemical Formula 1 (y is determined according to x, because $x+y=1$).

Next, the method for preparing cardo copolybenzimidazoles disclosed herein will be explained in detail.

In another aspect, there is provided a method for preparing cardo copolybenzimidazoles, comprising the steps of:
i) dissolving 3,3'-diaminobenzidine and 9,9-bis(4-carboxyphenyl)fluorene as monomers and an aromatic dicarboxylic acid as a comonomer into a polymerization solvent under argon atmosphere and agitating them at 130-150° C. for 2-5 hours;
ii) heating the reaction mixture of i) to 170-180° C. to carry out polycondensation for 12-15 hours;
iii) carrying out precipitation of the polymer solution obtained from ii) in deionized water and removing the residual phosphoric acid; and
iv) carrying out drying in a vacuum oven at 60-100° C. to obtain polymer powder.

According to an embodiment, the aromatic dicarboxylic acid used as a comonomer in i) may be any one selected from the group consisting of 4,4'-oxybis(benzoic acid), diphenic acid, biphenyl-4,4'-dicarboxylic acid, 4,4'-sulfonyldibenzoic acid, 4,4'-(hexafluoroisopropylidene)bis(benzoic acid), terephthalic acid and isophthalic acid.

According to another embodiment, the polymerization solvent used in i) may be polyphosphoric acid. In a variant, a mixed solvent of phosphorus pentaoxide with methanesulfonic acid may be used.

<Chemical Formula I>

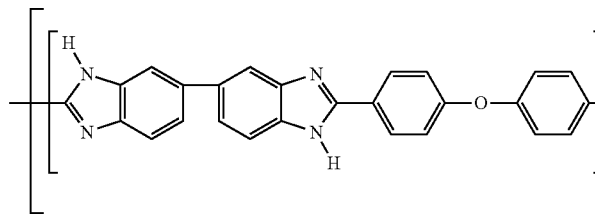

<Chemical Formula II>

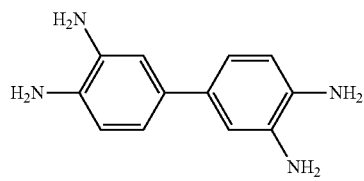

In Chemical Formula II, 9,9-bis(4-carboxyphenyl)fluorene is a cardo group in polybenzimidazole repeating units, and serves to increase the distance between one polybenzimidazole chain and another, thereby contributing to improvement in solubility and gas permeability.

In addition, 4,4'-oxybis(benzoic acid) represented by the following Chemical Formula III is used as a comonomer reactant to provide the cardo copolybenzimidazoles disclosed herein.

<Chemical Formula III>

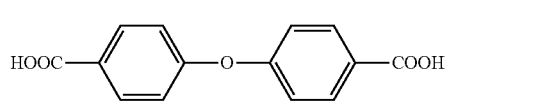

Aromatic ether groups are introduced to the polybenzimidazole backbone from 4,4'-oxybis(benzoic acid) of Chemical Formula III, thereby improving the brittleness unique to polybenzimidazole. In this manner, the resultant copolybenzimidazoles have significantly improved mechanical properties.

According to still another embodiment, the residual phosphoric acid may be removed in iii) by washing the precipitate with 12% aqueous ammonia at 40-50° C. for 2-3 days, followed by washing with deionized water to a neutral pH.

In still another aspect, there is provided a gas separation membrane using the cardo copolybenzimidazoles having the repeating units represented by the above Chemical Formula 1.

In yet another aspect, there is provided a method for producing a cardo copolybenzimidazole-based gas separation membrane, comprising the steps of:
i) dissolving powder of cardo copolybenzimidazoles into an organic solvent to provide a solution of cardo copolybenzimidazoles;
ii) filtering the solution of cardo copolybenzimidazoles through a porous syringe filter;
iii) applying the solution obtained from ii) on a flat glass plate; and
iv) drying the solution in a vacuum oven at 60-80° C. to obtain a transparent cardo copolybenzimidazole-based membrane.

According to an embodiment, the organic solvent used in i) may be any one selected from the group consisting of dimethyl sulfoxide (DMSO), dimethyl acetamide (DMAC), dimethyl formamide (DMF) and N-methylpyrrolidone (NMP). There is no particular limitation in selection of the organic solvent.

According to another embodiment, the solution of cardo copolybenzimidazoles may have a concentration of 2-15 wt %. When the concentration is less than 2 wt %, film-forming properties may be degraded. Although the concentration depends on the molecular weight of the resultant cardo copolybenzimidazoles, it is difficult to prepare a solution having a concentration higher than 15 wt %. Moreover, such a high-concentration solution causes a significant drop in gas permeability due to a large thickness, even if it may be formed into a film shape.

According to still another embodiment, the transparent cardo copolybenzimidazole-based membrane obtained from iv) may have a thickness of 30-60 μm. When the thickness is less than 30 μm, the gas separation membrane may not serve as a separator due to a decrease in mechanical strength. On the other hand, when the thickness is greater than 60 μm, the membrane is too thick to provide sufficient gas permeability.

EXAMPLES

The examples and comparative examples related to the method for preparing cardo copolybenzimidazoles and the method for producing gas separation membranes using the same will now be described. The following examples and experiments are for illustrative purposes only and not intended to limit the scope of this disclosure.

Example 1

Preparation of Cardo Copolybenzimidazoles

First, 3.0 g (14 mmol) of 3,3'-diaminobenzidine and 2.85 g (7 mmol) of 9,9-bis(4-carboxyphenyl)fluorene as monomers, 1.81 g (7 mmol) of 4,4'-oxybis(benzoic acid) as a comonomer, and 125 g of polyphosphoric acid as a polymerization solvent are introduced to a round-bottom flask, and agitated at 150° C. under argon gas atmosphere for 5 hours. After the monomers and comonomer are dissolved sufficiently, the reaction mixture is heated gradually to 180° C. to carry out reaction for 15 hours. Then, the polymer solution is allowed to precipitate in deionized water and the residual phosphoric acid is removed by washing the precipitate with 12% aqueous ammonia at 50° C. for 3 days. Finally, the precipitate is washed with deionized water to a neutral pH and dried in a vacuum oven at 60° C. to obtain cardo copolybenzimidazoles. The reaction scheme for preparing the cardo copolybenzimidazoles according to Example 1 is shown below.

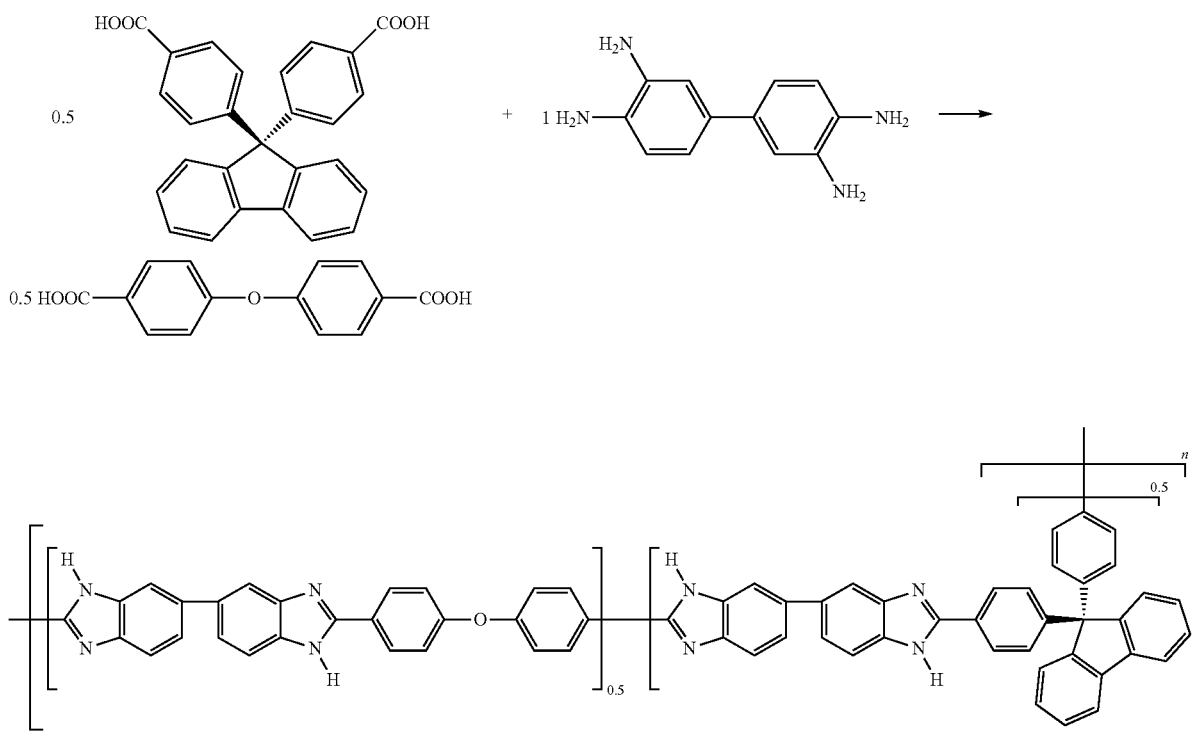

Example 2

Preparation of Cardo Copolybenzimidazoles

Example 1 is repeated to provide cardo copolybenzimidazoles, except that 3.0 g (14 mmol) of 3,3'-diaminobenzidine and 5.13 g (12.6 mmol) of 9,9-bis(4-carboxyphenyl)fluorene are used as monomers, and 0.36 g (1.4 mmol) of 4,4'-oxybis(benzoic acid) is used as a comonomer. The reaction scheme for preparing the cardo copolybenzimidazoles according to Example 2 is shown below.

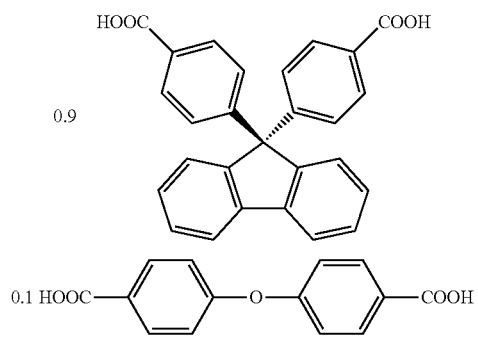

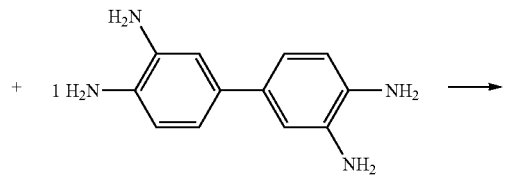

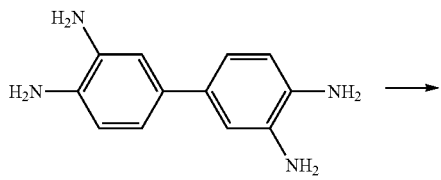

-continued

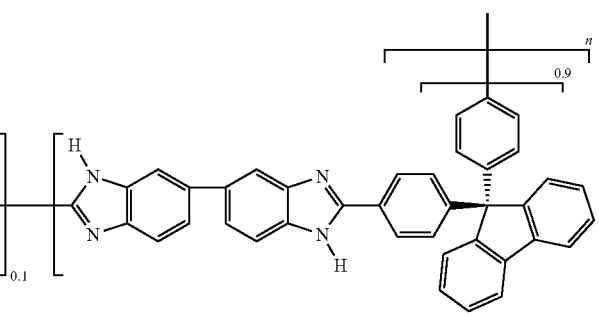

Comparative Example 1

Preparation of Cardo Polybenzimidazole Homopolymer

Example 1 is repeated to provide cardo polybenzimidazole homopolymer, except that 3.0 g (14 mmol) of 3,3'-diaminobenzidine and 5.6 g (14 mmol) of 9,9-bis(4-carboxyphenyl)fluorene are used as monomers, and no comonomer is used. The reaction scheme for preparing the cardo polybenzimidazole homopolymer according to Comparative Example 1 is shown below.

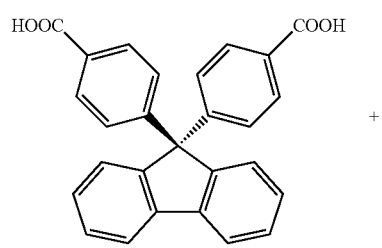

-continued

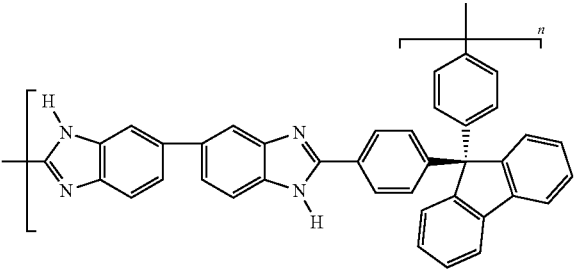

Comparative Example 2

Preparation of Polybenzimidazole Homopolymer

Comparative Example 1 is repeated to provide polybenzimidazole homopolymer, except that 2.33 g (14 mmol) of isophthalic acid is used instead of 5.6 g (14 mmol) of 9,9-bis(4-carboxyphenyl)fluorene. The reaction scheme for preparing the polybenzimidazole homopolymer according to Comparative Example 2 is shown below.

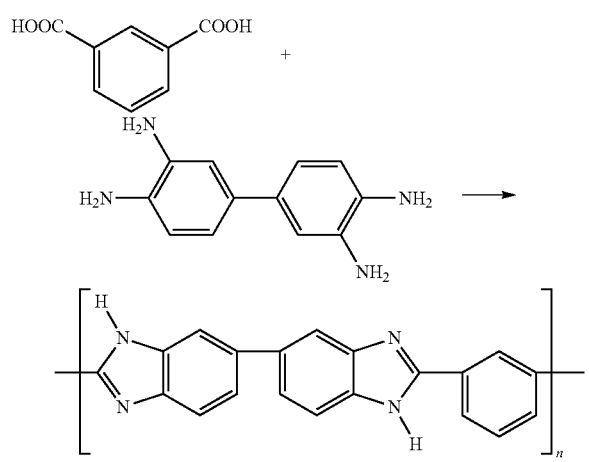

FIG. 1 shows $^1$H-NMR spectrum of cardo copolybenzimidazoles obtained from Example 1. It can be seen that the characteristic peaks of hydrogen atoms present in 4,4'-oxybis(benzoic acid) are identified at a chemical shift of 7.86 ppm and 8.3 ppm, suggesting that the copolybenzimidazoles are synthesized. In addition, the characteristic peaks of hydrogen atoms present in 4,4'-oxybis(benzoic acid) are identified in the $^1$H-NMR spectrum of the cardo copolybenzimidazoles obtained from Example 2.

Figure 2:
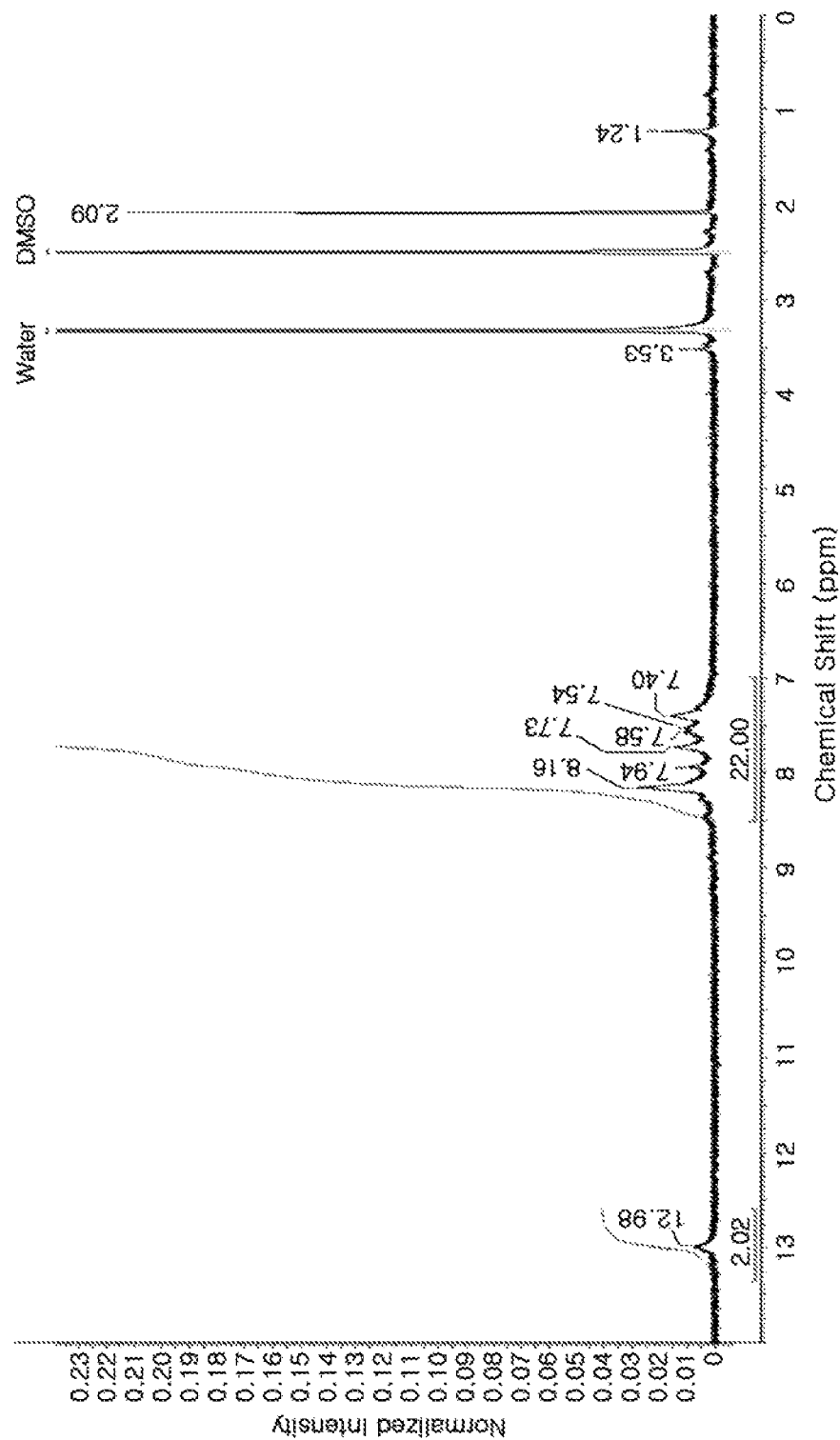
FIG. 2 shows $^1$H-NMR spectrum of cardo polybenzimidazole homopolymer obtained from Comparative Example 1.

As shown in FIG. 2 with regard to Comparative Example 1, the characteristic peaks of polybenzimidazole chains corresponding to N—H hydrogen atoms of imidazole ring are identified at a chemical shift of 12.99 ppm, and aromatic protons of benzene ring are identified at a chemical shift of 7.38-8.15 ppm, suggesting that polybenzimidazole homopolymer is synthesized.

Example 3

Production of Cardo Copolybenzimidazole-Based Gas Separation Membrane

First, 1 g of the cardo copolybenzimidazoles obtained from Example 1 is dissolved into 49 g of dimethyl sulfoxide (DMSO) as an organic solvent to provide a solution of cardo copolybenzimidazoles having a concentration of 2 wt %. The polymer solution is filtered through a syringe filter having a pore size of 0.45 μm, applied to a flat glass plate, and dried in an oven at 80° C. to obtain a transparent cardo copolybenzimidazole-based gas separation membrane having a thickness of 40-50 μm.

Example 4

Production of Cardo Copolybenzimidazole-Based Gas Separation Membrane

Example 3 is repeated to provide a cardo copolybenzimidazole-based gas separation membrane, except that the cardo copolybenzimidazole obtained from Example 2 is used.

Comparative Example 3

Production of Cardo Polybenzimidazole Homopolymer-Based Gas Separation Membrane

Example 3 is repeated to provide a cardo polybenzimidazole homopolymer-based gas separation membrane, except that the cardo polybenzimidazole homopolymer obtained from Comparative Example 1 is used.

Comparative Example 4

Production of Polybenzimidazole Homopolymer-Based Gas Separation Membrane

Example 3 is repeated to provide a polybenzimidazole homopolymer-based gas separation membrane, except that the polybenzimidazole homopolymer obtained from Comparative Example 2 is used.

Figure 3:
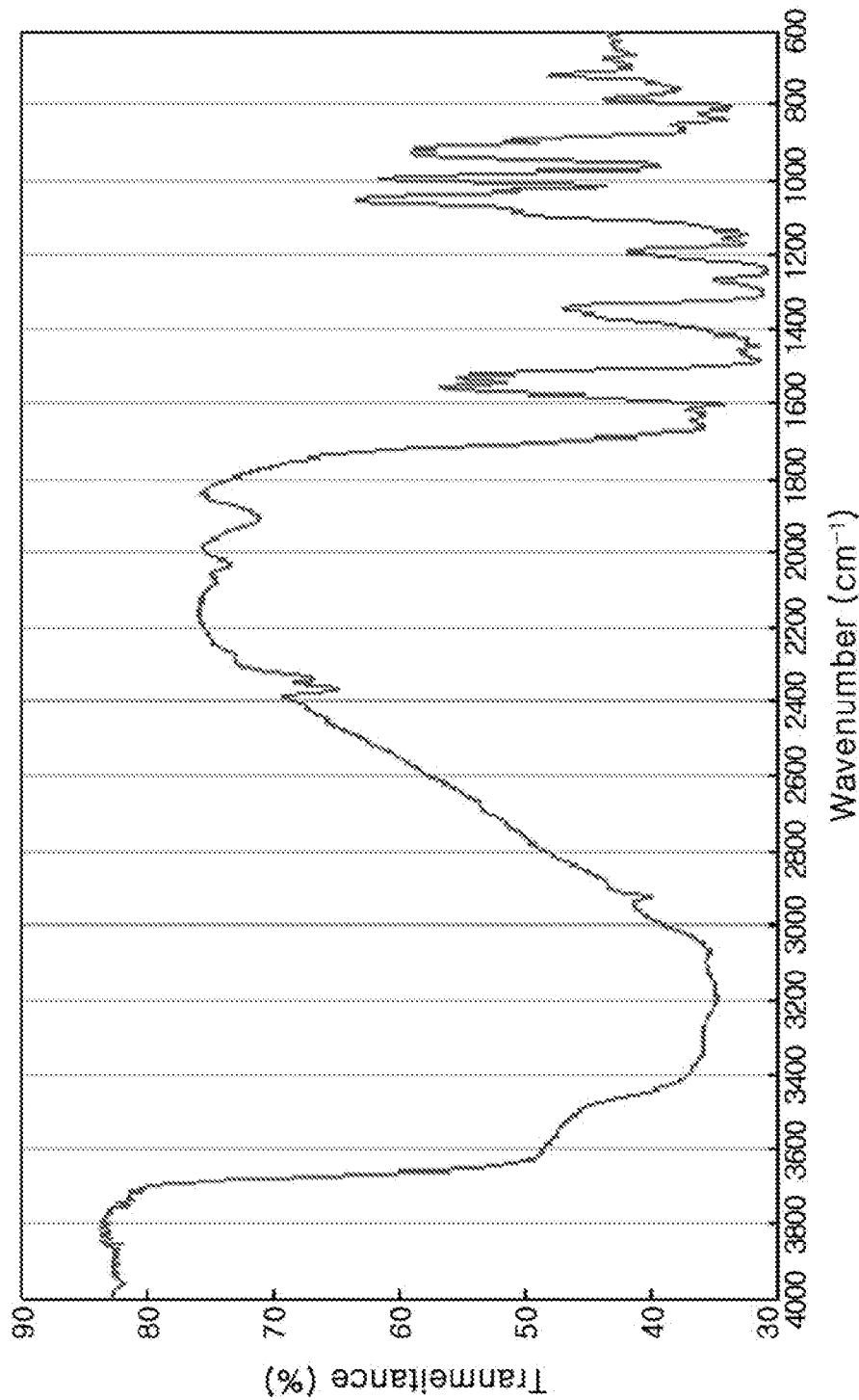
FIG. 3 shows FT-IR spectrum of the cardo copolybenzimidazole-based gas separation membrane obtained from Example 3.

FIG. 3 shows Fourier Transform-Infrared spectrometry (FT-IR) spectrum of the cardo copolybenzimidazole-based gas separation membrane obtained from Example 3. The stretching vibration peaks of aromatic ether groups are identified at approximately 1241 cm$^{-1}$, and they are derived from the comonomer, 4,4'-oxybis(benzoic acid). This suggests that the target copolybenzimidazole-based gas separation membrane is obtained. The same results are obtained from the FT-IR spectrum of the cardo copolybenzimidazole-based gas separation membrane according to Example 4.

Figure 4:
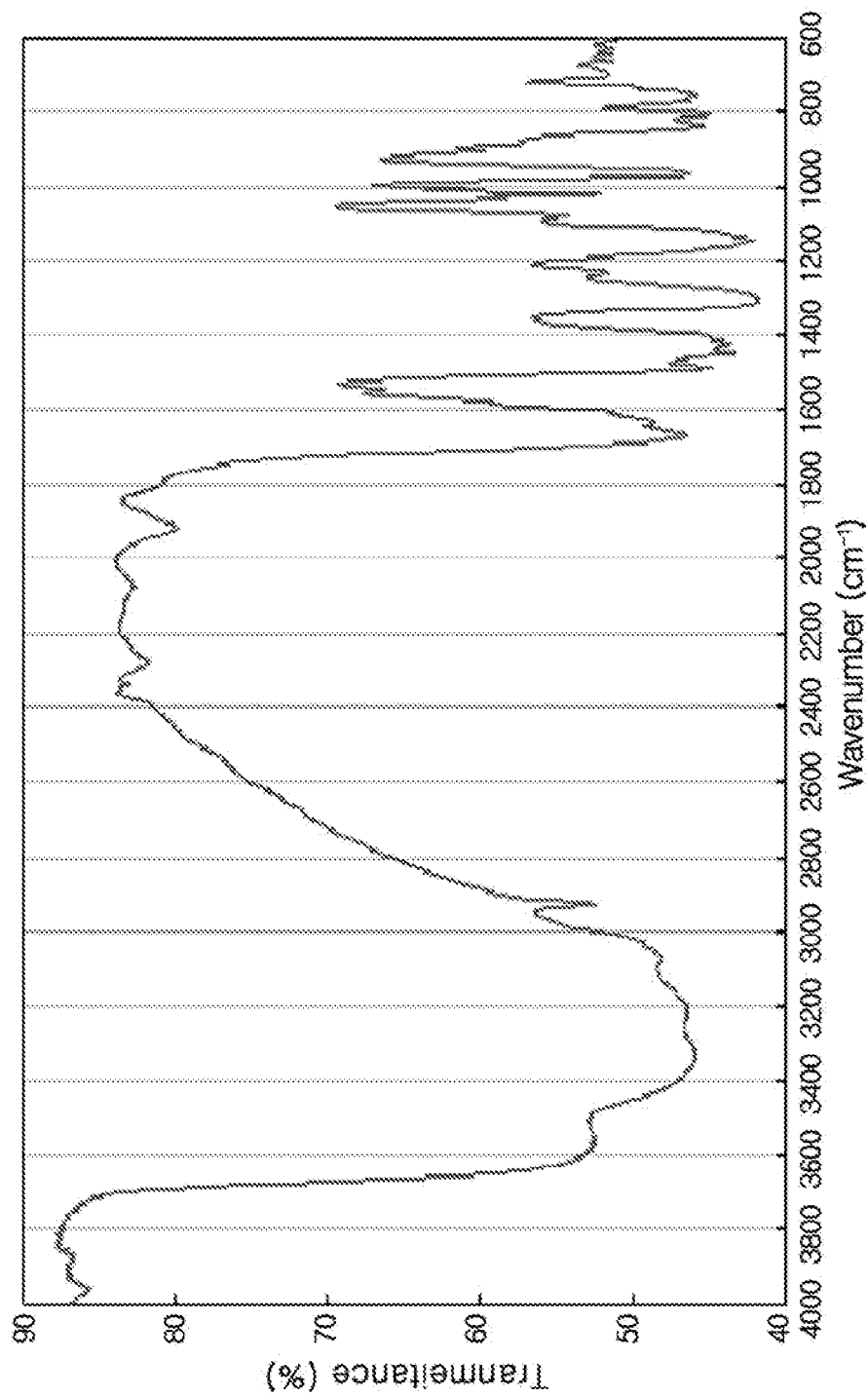
FIG. 4 shows FT-IR spectrum of the cardo polybenzimidazole homopolymer-based gas separation membrane obtained from Comparative Example 3.

FIG. 4 shows FT-IR spectrum of the cardo polybenzimidazole homopolymer-based gas separation membrane obtained from Comparative Example 3. The characteristic peaks of imidazole groups are identified approximately at 3300 cm$^{-1}$ (NH), 1610 cm$^{-1}$ (C=N), 1250 cm$^{-1}$ and 810 cm$^{-1}$, suggesting that the cardo polybenzimidazole homopolymer-based gas separation membrane is obtained.

Figure 5:
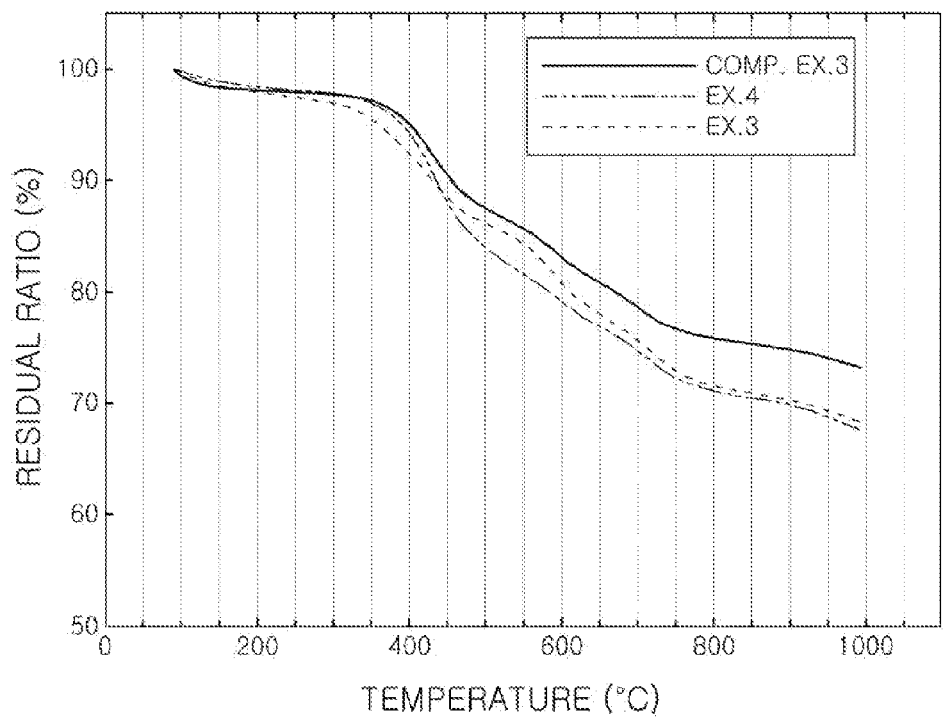
FIG. 5 shows the results of thermogravimetric analysis of each of the cardo copolybenzimidazole-based gas separation membranes obtained from Examples 3 and 4 and the cardo polybenzimidazole homopolymer-based gas separation membrane obtained from Comparative Example 3.

Meanwhile, FIG. 5 shows the results of thermogravimetric analysis (TGA) of each of the cardo copolybenzimidazole-based gas separation membranes obtained from Examples 3 and 4 and the cardo polybenzimidazole homopolymer-based gas separation membrane obtained from Comparative Example 3. After carrying out TGA to 1,000° C., it is determined that the ratio of residual weight of Example 3 is 70.07 wt %, that of Example 4 is 69.41 wt %, and that of Comparative Example 3 is 74 wt %.

Example 3 to Comparative Example 3 show an initial thermal decomposition temperature of 300° C.-350° C. Thus, the cardo copolybenzimidazole-based gas separation membrane disclosed herein tend to show a decrease in initial thermal decomposition temperature in accordance with an increase in the molar content of aromatic ether groups derived from the comonomer, 4,4'-oxybis(benzoic acid) in the repeating units of copolymer. Therefore, it can be seen that the copolybenzimidazoles still maintain overall thermal stability although they show a slightly lower initial thermal decomposition temperature as compared to the cardo polybenzimidazole homopolymer according to the related art.

Figure 6:
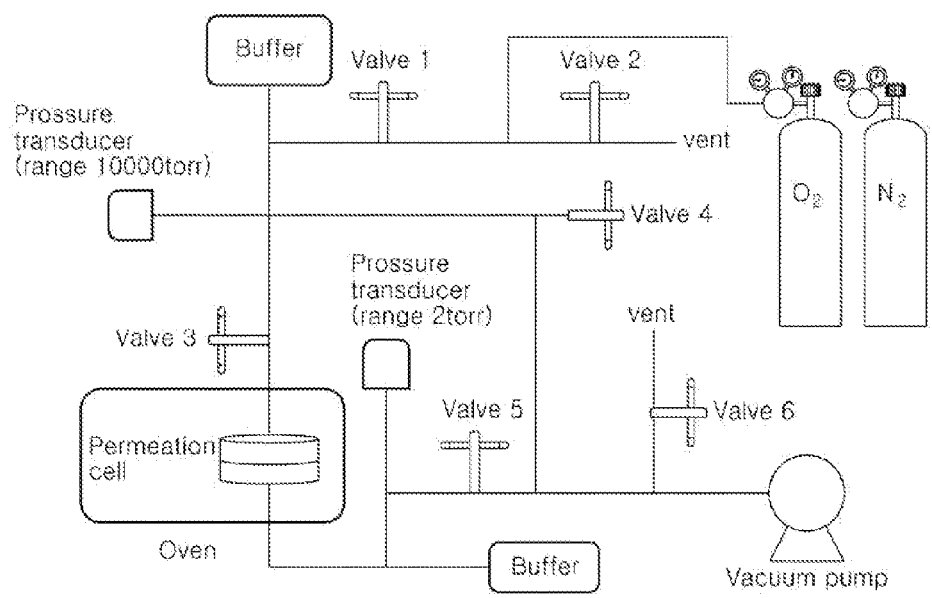
FIG. 6 is a schematic view illustrating a system for determining gas permeability used herein.

Further, the gas permeability of the cardo copolybenzimidazole-based gas separation membrane disclosed herein is determined by using the gas permeability measuring system as shown in FIG. 6.

In general, permeation of gas through a polymeric membrane may be understood by a function of diffusibility D and solubility S. The diffusibility is determined by the fractional free volume (FFV) inside a polymeric membrane and chain mobility. The solubility is determined by the interaction between gas molecules and polymer molecules. FFV is a space participating in transport of gas molecules and is defined as a ratio of the space non-occupied by the polymer in the total volume of polymeric membrane. In addition, FFV is affected by a variation in chain mobility, polymer packing density and side groups of a chain, and is related directly with diffusibility. The solubility shows an increase with an increase in FFV, and undergoes a change depending on side groups. However, it is known that the function of diffusibility is predominant in view of the overall permeability.

Figure 7:
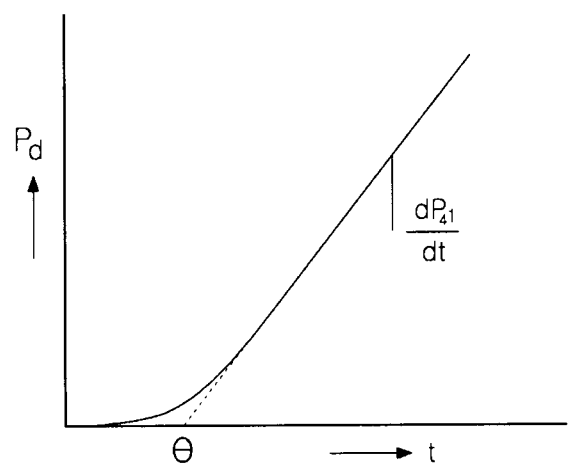
FIG. 7 is a time-lag graph obtained by measuring the pressure at the bottom portion of the membrane as a function of time.

A polymeric membrane is mounted to a permeation cell and all of the residual gas in the membrane is removed under reduced pressure applied by a vacuum pump at both sides of the membrane. At the initial time of the experiment, t=0, determination of gas permeability is started, while a specific gas (oxygen or nitrogen) is introduced to the top portion of the membrane under a constant pressure, $P_{feed}$. The pressure at the bottom portion of the membrane is measured as a function of time to obtain a time-lag graph shown in FIG. 7. In the time-lag graph, time-lag $\theta$ is obtained from the steady-state portion of the graph by extrapolation, and diffusibility D is calculated by using the membrane thickness d according to the following Formula (1).

$$D = d^2/6\theta \quad (1)$$

Gas permeability P is calculated by using the slope of the linear steady-state region of the time-lag graph and the following Formula (2). $P_{feed}$ represents the gas pressure (cmHg) applied to the top portion of the membrane, $V_d$ represents the volume of the gas permeation system at the bottom portion of the membrane, $M_{gas}$ represents the molecular weight (g/mol) of the gas permeating through the membrane, $\rho$ represents the density (cm$^3$/g) of the gas permeating through the membrane, and A represents the area (cm$^2$) of the membrane through which the gas permeates.

$$P = (1/P_{feed}) \cdot (V_d M_{gas} d/\rho RTA) \cdot (dp_d/dt) \quad (2)$$

The solubility of a gas, S, is calculated from the following Formula (3) by using the relationship between diffusibility D and permeability P, and the permeability is represented in the unit of Barrer [10$^{-10}$ cm$^3$(STP)cmcm$^{-2}$s$^{-1}$cmHg$^{-1}$].

$$P = D \cdot S \quad (3)$$

When two kinds of gases (gas A and gas B) form a mixed gas and the mixed gas permeates through a separation membrane, selectivity of gas A over gas B ($\alpha_{AB}$) is defined according to the following Formula (4). In Formula (4), $P_A$ and $P_B$ represents the permeability of gas A and that of gas B, respectively.

$$\alpha_{AB} = P_A/P_B \quad (4)$$

The permeability of a gas is affected by operating conditions (temperature, pressure, etc.), solubility of gas (solubility of gas increases as condensability of gas increases), reactivity between polymer and permeating gas, polymer morphology (crystallinity, orientation, etc.), or the like. Therefore, all of the separation membrane samples used in the following test and the permeation experiment are provided under the same conditions by the same procedure.

[Test for Determination of Gas Permeability]

In this test for determination of gas permeability, a gas permeation cell having an effective membrane area of 14.52 cm$^2$ is installed in an oven, and a vacuum pump is used for depression in order to remove the gas molecules totally at the top and bottom portions of a separation membrane. At the top portion of the separation membrane, gas is introduced to the gas storage container at an applicable pressure of 1000 torr and time-lag measurement is started at the same time. The pressure difference varied by the pressure of the permeating gas is recorded automatically every unit time by a computer linked to MKS Baratron gauge. If the pressure of the bottom portion of the membrane is low sufficient to be ignored as compared to the pressure of the top portion of the membrane, it can be assumed that any reaction between gases permeating through the membrane does not occur and plasticization of the membrane material is not induced.

The following Table 1 shows the gas permeability of each gas separation membranes using the cardo copolybenzimidazoles and cardo polybenzimidazole homopolymer, obtained from Examples 3 and 4 and Comparative Example 4.

TABLE 1

| Test | Permeability coefficient (unit: Barrer) | | | Selectivity |
| --- | --- | --- | --- | --- |
| | $O_2$ | $N_2$ | $CO_2$ | $O_2/N_2$ |
| Ex. 3 | 3.92 | 0.61 | 18.23 | 6.43 |
| Ex. 4 | 10.68 | 1.98 | 49.41 | 5.39 |
| Comp. Ex. 3 | — | — | — | — |
| Comp. Ex. 4 | 0.23 | 0.03 | ND* | 7.66 |

ND*: Not determined

Comparative Example 3: the membrane is too brittle to perform the test for determination of gas permeability.

As can be seen from Table 1, the cardo copolybenzimidazole-based gas separation membrane provides oxygen permeability and nitrogen permeability approximately 17 times and 20 times higher than the oxygen permeability and nitrogen permeability of the polybenzimidazole homopolymer-based gas separation membrane having no cardo group according to Comparative Example 4, respectively.

Particularly, in the case of the cardo copolybenzimidazole-based gas separation membrane obtained from Example 4, oxygen permeability and nitrogen permeability are improved by a factor of approximately 46 and 66, respectively.

It is thought that such a significant improvement in oxygen permeability of the cardo copolybenzimidazole-based gas separation membrane disclosed herein results from introduction of fluorene units to the polybenzimidazole backbone as cardo groups and additional introduction of aromatic ether groups derived from a comonomer, 4,4'-oxybis(benzoic acid), leading to improvement in mechanical properties and induction of bending and distortion of polybenzimidazole chain structures, and thus an increase in space between chains, i.e., free volume.

Therefore, the cardo copolybenzimidazole-based gas separation membrane disclosed herein provides significantly improved oxygen permeability, and thus may be used as a material suitable for $O_2/N_2$ separation in OBIGGS.

While the present invention has been described with respect to the specific embodiments, it will be apparent to those skilled in the art that various changes and modifications may be made without departing from the spirit and scope of the invention as defined in the following claims.

What is claimed is:

1. Cardo copolybenzimidazoles having repeating units represented by the following Chemical Formula 1:

<Chemical Formula 1>

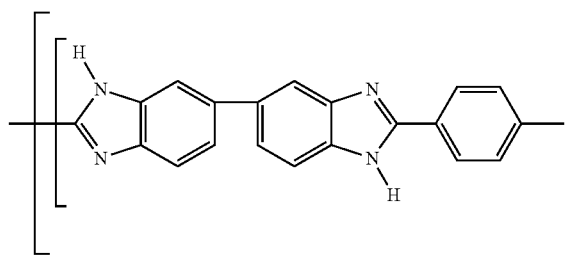

-continued

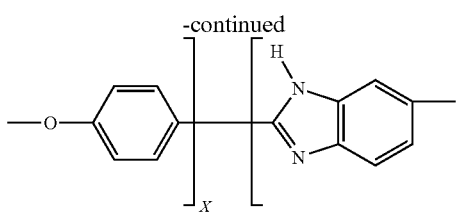

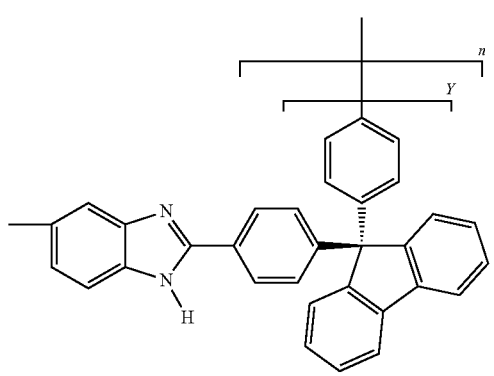

wherein 0.05≤x≤0.5, 0.5≤y≤0.95, and x+y=1.

2. A method for preparing cardo copolybenzimidazoles, comprising the steps of:
   i) dissolving 3,3'-diaminobenzidine and 9,9-bis(4-carboxyphenyl)fluorene as monomers and an aromatic dicarboxylic acid as a comonomer into a polymerization solvent under argon atmosphere and agitating them at 130-150° C. for 2-5 hours;
   ii) heating the reaction mixture of i) to 170-180° C. to carry out polycondensation for 12-15 hours;
   iii) carrying out precipitation of the polymer solution obtained from ii) in deionized water and removing the residual phosphoric acid; and
   iv) carrying out drying in a vacuum oven at 60-100° C. to obtain polymer powder.

3. The method for preparing cardo copolybenzimidazoles according to claim 2, wherein the aromatic dicarboxylic acid used as a comonomer in i) is any one selected from the group consisting of 4,4'-oxybis(benzoic acid), diphenic acid, biphenyl-4,4'-dicarboxylic acid, 4,4'-sulfonyldibenzoic acid, 4,4'-(hexafluoroisopropylidene)bis(benzoic acid), terephthalic acid and isophthalic acid.

4. The method for preparing cardo copolybenzimidazoles according to claim 2, wherein the polymerization solvent used in i) is polyphosphoric acid, or a mixed solvent of phosphorus pentaoxide with methanesulfonic acid.

5. The method for preparing cardo copolybenzimidazoles according to claim 2, wherein the residual phosphoric acid is removed in iii) by washing the precipitate with 12% aqueous ammonia at 40-50° C. for 2-3 days, followed by washing with deionized water to a neutral pH.

6. A gas separation membrane using the cardo copolybenzimidazoles having the repeating units represented by the Chemical Formula 1 in claim 1.

7. A method for producing a cardo copolybenzimidazole-based gas separation membrane, comprising the steps of:
   i) dissolving powder of cardo copolybenzimidazoles into an organic solvent to provide a solution of cardo copolybenzimidazoles, wherein the cardo copolybenzimidazoles having repeating units represented by the following Chemical Formula 1:

Chemical Formula 1

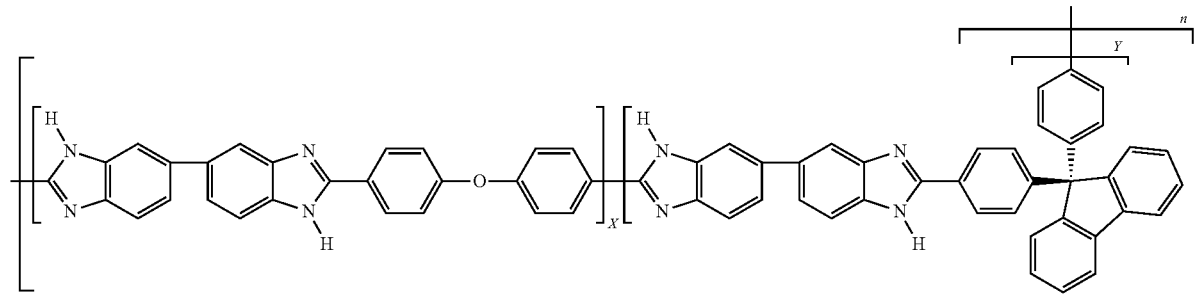

wherein 0.05≤x≤0.5, 0.5≤y≤0.95, and x+y=1;
ii) filtering the solution of cardo copolybenzimidazoles through a porous syringe filter;
iii) applying the solution obtained from ii) on a flat glass plate; and
iv) drying the solution in a vacuum oven at 60-100° C. to obtain a transparent cardo copolybenzimidazole-based membrane.

8. The method for producing a cardo copolybenzimidazole-based gas separation membrane according to claim 7, wherein the organic solvent used in i) is any one selected from the group consisting of dimethyl sulfoxide (DMSO), dimethyl acetamide (DMAC), dimethyl formamide (DMF) and N-methylpyrrolidone (NMP).

9. The method for producing a cardo copolybenzimidazole-based gas separation membrane according to claim 7, wherein the solution of cardo copolybenzimidazoles has a concentration of 2-15 wt %.

10. The method for producing a cardo copolybenzimidazole-based gas separation membrane according to claim 7, wherein the transparent cardo copolybenzimidazole-based membrane obtained from iv) has a thickness of 30-60 μm.

11. A method for preparing cardo copolybenzimidazoles, the method comprising:
dissolving 3,3'-diaminobenzidine, 9,9-bis(4-carboxyphenyl)fluorine, and an aromatic dicarboxylic acid into a polymerization solvent to form a reaction mixture; and
heating the reaction mixture to form the cardo copolybenzimidazoles having repeating units represented by the following Chemical Formula 1:

dicarboxylic acid, 4,4'-sulfonyldibenzoic acid, 4,4'-(hexafluoroisopropylidene)bis(benzoic acid), terephthalic acid and isophthalic acid.

14. The method of claim 11, wherein the polymerization solvent comprises polyphosphoric acid, or a mixed solvent of phosphorus pentaoxide with methanesulfonic acid.

15. The method of claim 11, wherein dissolving is conducted under an argon atmosphere and by agitating at about 130° C. to about 150° C. for about 2 hours to about 5 hours.

16. The method of claim 11, wherein the 3,3'-diaminobenzidine and 9,9-bis(4-carboxyphenyl)fluorene act as monomers and the aromatic dicarboxylic acid acts as a comonomer in the polymerization solvent when heating the reaction mixture.

17. The method of claim 11, wherein heating the reaction mixture is conducted at about 170° C. to about 180° C. to carry out polycondensation for about 12 hours to about 15 hours.

Chemical Formula 1

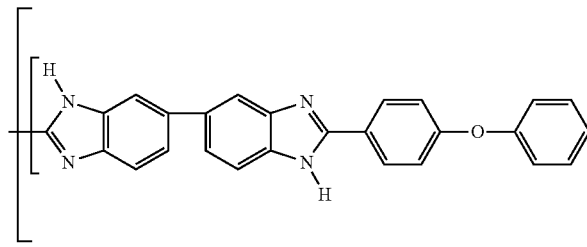
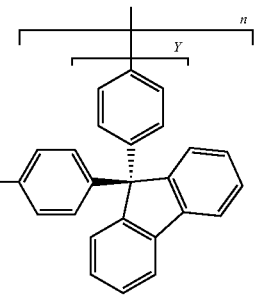

wherein 0.05≤x≤0.5, 0.5≤y≤0.95, and x+y=1.

12. The method of claim 11, further comprising:
precipitating the cardo copolybenzimidazoles in water;
removing residual phosphoric acid from the precipitate; and
drying the precipitate.

13. The method of claim 11, wherein the aromatic dicarboxylic acid is at least one selected from the group consisting of 4,4'-oxybis(benzoic acid), diphenic acid, biphenyl-4,4'-

18. The method of claim 12, wherein the residual phosphoric acid is removed by washing the precipitate with about 12% aqueous ammonia at about 40° C. to about 50° C. for about 2 days to about 3 days, followed by washing with water to a neutral pH.

19. The method of claim 12, wherein drying the precipitate is performed in a vacuum oven at about 60° C. to about 100° C. to obtain polymer powder.

* * * * *